2,873,579
DUAL BRAKE CYLINDER WITH LOCK

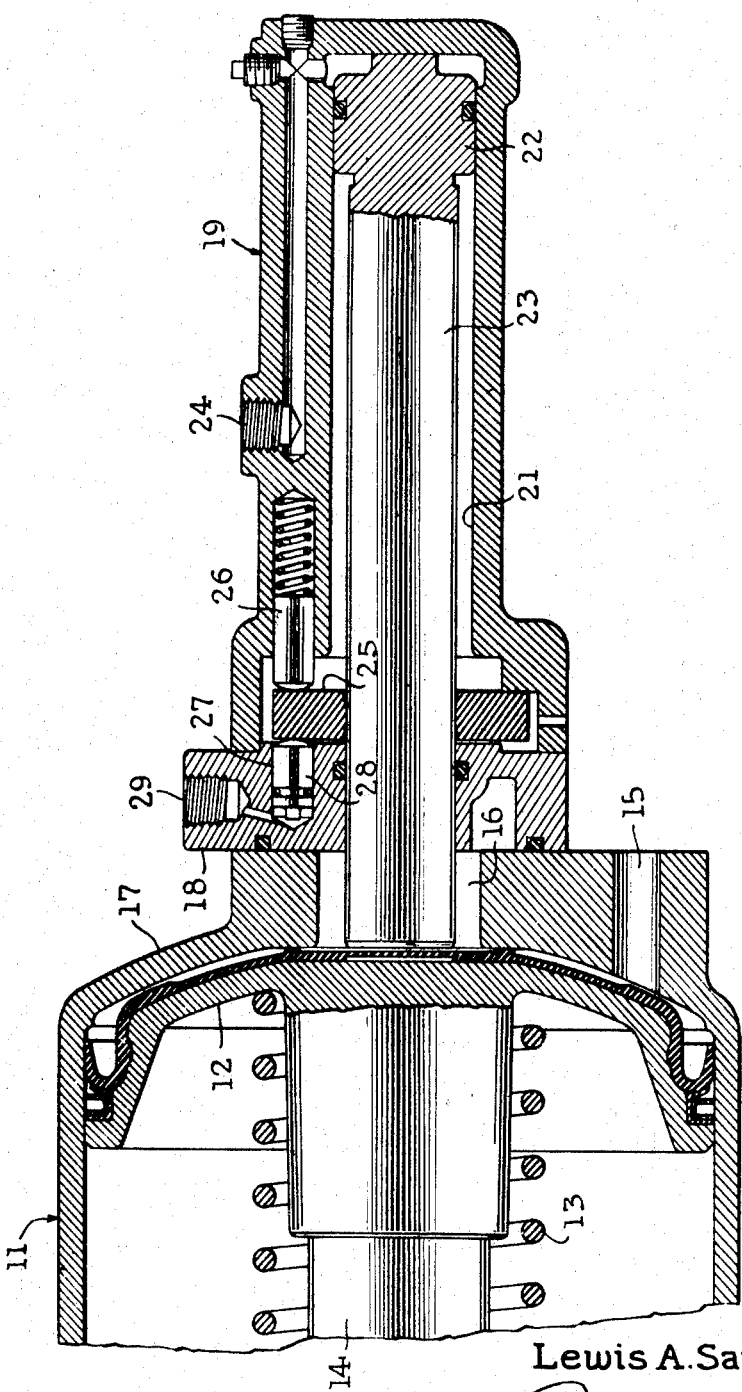

Lewis A. Safford, Watertown, N. Y., assignor to The New York Air Brake Company, a corporation of New Jersey Application November 9, 1955, Serial No. 545,910

1 Claim. (Cl. 60—97)

This invention relates to a dual brake cylinder primarily intended for use on railway vehicles.

The device includes two aligned brake cylinders designed to be mounted to actuate conventional brake rigging. The two cylinders are aligned and each includes a cylinder and a piston. One piston is actuated by pneumatic pressure and the other is hydraulically actuated. The hydraulically actuated piston is provided with a cant ring lock which may be actuated to prevent retraction of the piston from its brake actuating position. Once such a cant ring lock is set, accidental release is prevented so long as a force reacts against the piston to urge it towards its release position. This reaction force might be eliminated if the pneumatic cylinder is actuated after actuation of the hydraulic cylinder. According to the present invention, the piston rod of the hydraulic motor extends into the working space of the pneumatic motor and bears against the piston of that motor except when that piston is actuated by the pneumatic brake control in which case the pneumatic piston might move out of contact with the piston rod of the hydraulic motor. Under these conditions the fluid pressure in the working space of the pneumatic motor will react on the end of the piston rod of the hydraulic motor and bias it in a brake releasing direction. This bias would serve to maintain the cant ring lock in locked position.

The dual cylinder of the present invention is desirable because it can be mounted on cars of many different types, whereas the two cylinder arrangement illustrated in the Huber patent, No. 2,673,624, issued March 30, 1954, and assigned to applicant's assignee would not be suitable for installations where only limited space is available.

The invention will be described having reference to the accompanying drawing of the preferred embodiment of the invention. The drawing is a fragmentary axial sectional view.

Reference numeral 11 indicates a conventional pneumatic cylinder, shown only in part, which has a piston 12 provided with suitable packing. A return spring 13 encircles the piston rod 14 and reacts between the piston 12 and a cylinder head, not shown. A fluid pressure connection 15 is provided by which the pneumatic cylinder may be charged or vented by any conventional control means not shown.

An aperture 16 is formed in the center of head 17 of the cylinder 11. The head 17 is provided with a flat surface to which the cylinder head 18 of a hydraulic brake motor 19 may be fastened by bolts not shown.

The hydraulic motor 19 includes a cylinder 21 fastened to the head 18. A piston 22 is slidable in the cylinder 21 and is provided with a piston stem 23 which extends through an aperture in the head 18 and aperture 16. In the illustrated release position of the braking motors the stem 23 engages the piston 12. The working space of motor 19 has a pressure connection 24 through which pressure liquid may be admitted thereto or exhausted therefrom.

The piston stem 23 is encircled by a canting, locking ring 25 located in an annular recess in the cylinder 21. A spring biased member 26 urges the ring 25 to the position shown. The cylinder head 18 has a motor cylinder 27 formed therein which receives a locking motor piston 28. The locking motor working space is provided with a connection 29 through which pressure liquid may be admitted thereto or exhausted therefrom.

In operation, the pneumatic cylinder 11 may be operated in the usual fashion without any change due to the presence of the hydraulic motor 19. Because the air pressure in cylinder 11 will be dissipated over a period of time, it is desirable to provide a secondary braking means which can be independently operated. Desirably it should be arranged so that a minimum of additional space is required and so that the pneumatic and hydraulic brakes have no adverse effect on one another.

The hydraulic motor 19 is actuated by the admission of pressure liquid through the connection 24. As the piston rod 23 is moved outward, the piston 12 is moved outward. When the slack in the brake is taken up and the brakes are set with the desired force, pressure liquid is admitted to the locking motor through connection 29 to lock the brakes in applied position. Even if pressure leaks off from the working of the braking motor 19 and the locking motor, the cant locking ring 25 remains locked because with the brakes set there is a substantial reaction force on the piston rod 23 urging it toward release position. If with the hydraulic brakes set and after the pressure has dissipated from the locking and brake motors, the pneumatic cylinder is actuated, there would be the possibility, because the pneumatic cylinder might exert a greater force than the hydraulic motor, that the reaction force on the piston rod 23 of the hydraulic motor 19 would be removed. This would permit the spring biased member 26 to release the lock. In order to prevent inadvertent release of the hydraulic brake, the cylinders are arranged so the pressure developed in the pneumatic cylinder reacts on the piston stem 23 of the hydraulic motor 18 to maintain the reaction force necessary to keep the lock ring in its canted or locking position. In essence the working space of the cylinder 11 under these conditions acts as an air spring between the rod 23 and brake rigging.

What is claimed is:

A dual brake motor comprising in combination a pneumatically actuated piston motor having a working space to and from which pressure fluid may be supplied and exhausted; an hydraulically actuated piston motor; a piston rod connected with said hydraulically actuated motor and extending into said working space and normally into thrust engagement with the piston of said pneumatic motor, the portion of the piston rod extending into said working space in any position of said hydraulically actuated piston motor being of uniform diameter; supply and exhaust means for said hydraulic motor; a cant ring lock encircling said piston rod; continuously effective spring means biasing the ring lock toward an inactive position; and means operable to shift the ring lock to an active position in which it holds said piston rod against movement in a brake-releasing direction, said ring lock once shifted being held in the active position by the force acting in a brake-releasing direction on said piston rod.

References Cited in the file of this patent

UNITED STATES PATENTS

| 2,673,624 | Huber | Mar. 30, 1954 |
| 2,726,738 | Fawick | Dec. 13, 1955 |
| 2,759,569 | Keehn | Aug. 21, 1956 |